United States Patent Office 2,938,705
Patented May 31, 1960

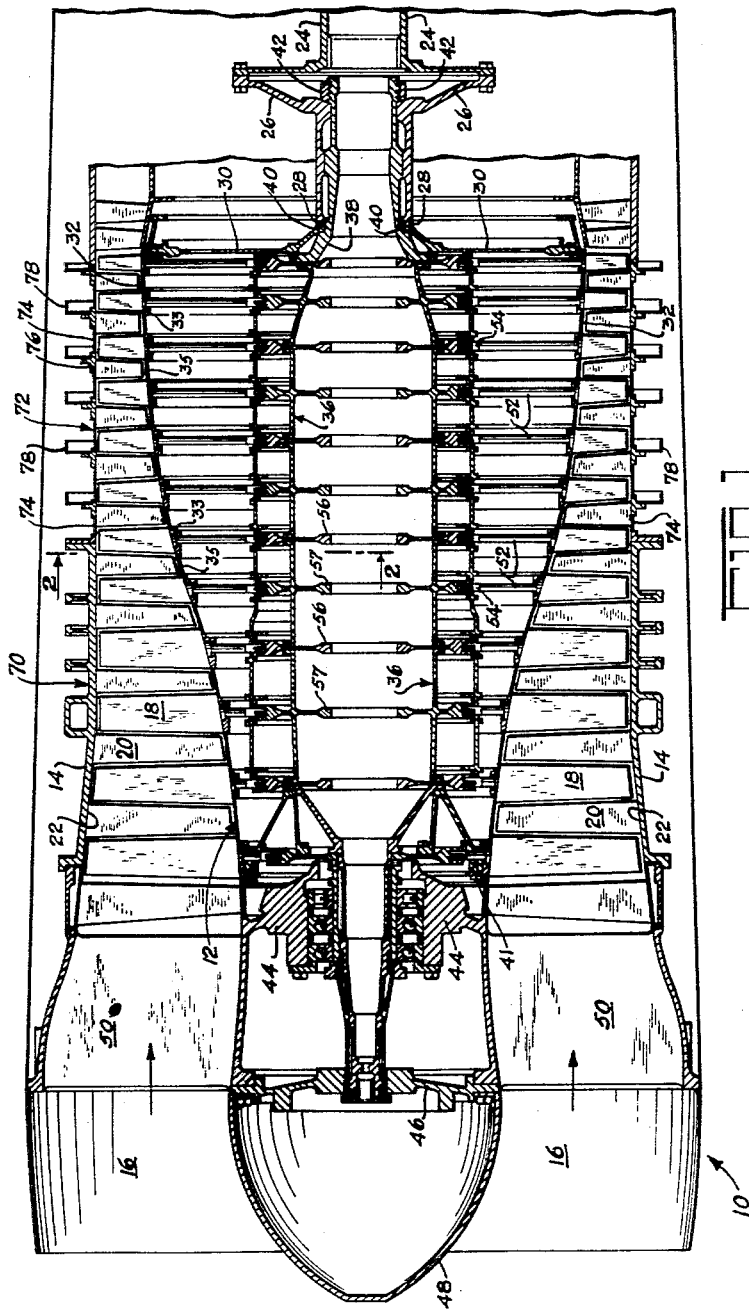

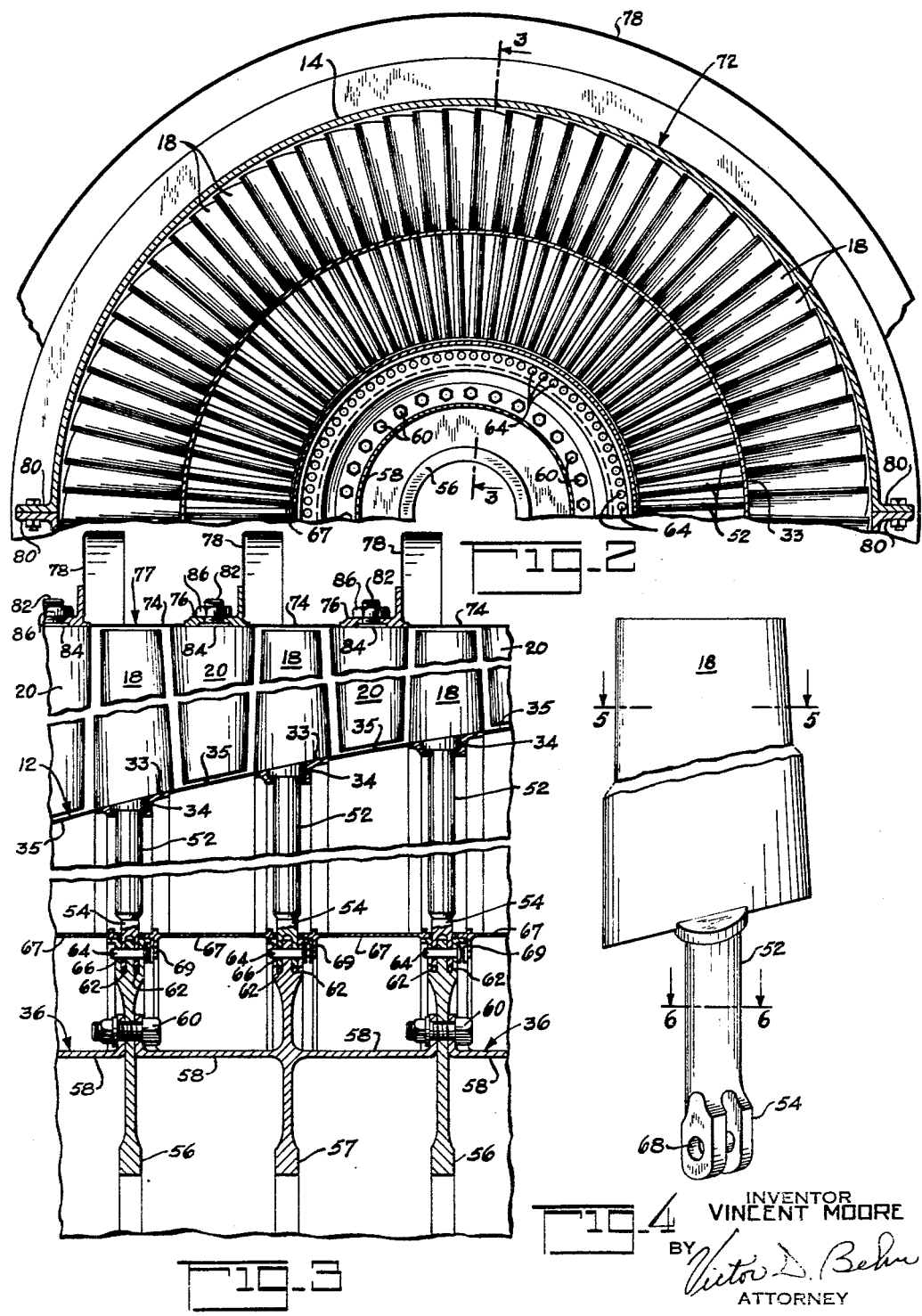

2,938,705

LIGHTWEIGHT COMPRESSOR OR TURBINE STRUCTURE

Vincent Moore, Glen Rock, N.J., assignor to Curtiss-Wright Corporation, a corporation of Delaware Filed May 26, 1955, Ser. No. 511,181

8 Claims. (Cl. 253—39)

This invention relates to multi-stage bladed rotors and stators and is particularly directed to a multi-stage compressor and/or turbine having a plurality of axially-spaced sets or stages of blades.

An object of this invention comprises the provision of a novel and simple multi-stage bladed rotor which is both strong and light in weight, as is quite important in aircraft engines. In multi-stage bladed rotors of the prior art, it has been the general practice to secure each stage of rotor blades to individual discs, the hubs of which are formed integral with or are rigidly secured to a shaft extending through said rotor. This prior art construction results in a relatively heavy motor.

Another object of the invention comprises the provision of a novel and simple rotor construction in which the rotor has an annular drum from which the rotor blades project across the annular passage of the fluid with which said blades co-act, said drum not only forming a wall of said passage but also transmitting torque to or from said blades depending on whether said rotor is a compressor or a turbine and the connection between said drum and blades being such as to damp vibration of said blades. A further object of the invention is the provision of a simple and novel construction of the stator housing forming the other wall of said annular passage so as to provide a strong and light-weight stator construction capable of withstanding relatively high temperatures.

Specifically, the multi-stage rotor of the invention comprises a plurality of discs clamped together to form a rigid inner rotor shaft assembly; a plurality of rotor blades with each blade secured to a thin walled hollow spoke, each spoke being pivotally connected to a portion of the inner rotor shaft; and an outer rotor drum disposed between the radially inner ends of the rotor blades and the inner rotor shaft, said outer rotor drum serving as the radially inner wall of the fluid passage across which the rotor blades project with the blades having spoke-like shanks projecting inwardly through holes in said drum, the fit between said blade shanks and the walls of the holes in said drum being such as to provide a direct driving connection therebetween. In addition, the stator housing is constructed of a plurality of alternate forged rings and sheet metal rings welded together, with stiffeners added to maintain roundness.

Other objects of the invention will become apparent upon reading the annexed detailed description in connection with the drawing in which:

Fig. 1 is an axial sectional view through a rotor embodying the invention;

Fig. 2 is a transverse sectional view taken along line 2—2 of Fig. 1;

Fig. 3 is a partial view taken along line 3—3 of Fig. 2 and showing in detail the assembly of several rotor blades in the rotor.

Fig. 4 illustrates one preferred construction of the rotor blade and thin-walled spoke.

Fig. 5 is a sectional view taken along line 5—5 of Fig. 4 showing a typical hollow rotor blade in cross-section.

Fig. 6 is a sectional view taken along line 6—6 of Fig. 4 showing a thin-walled spoke in cross-section.

Referring first to Fig. 1 of the drawing, an axial flow fluid compressor 10 is illustrated as comprising a rotor 12 mounted for rotation within a housing 14, the annular space between said rotor and housing comprising the fluid flow path through which fluid enters from the compressor inlet 16 and is discharged in a compressed condition at the other end of said path. A plurality of axially-spaced stages or sets of blades 18 are carried by and project radially outwardly from the rotor 12 and a plurality of axially-spaced stages or sets of blades 20 are carried by and project radially inwardly from the inner cylindrical wall 22 of the stator housing 14, the stages of stator blades 20 alternating with the stages of rotor blades 18 as illustrated. The general construction of the axial flow compressor so far described is conventional and such compressors are commonly used, for example, in gas turbine engines for supplying the turbine combustion chamber with compressed air.

Referring now specifically to the compressor rotor construction, a shaft 24 delivering torque is drivably connected to a rotor drive shaft 26. The rotor drive shaft 26 is connected through radial splines 28 to the torque diaphragm 30, which in turn transmits the torque to a hollow rotor drum member 32. This rotor drum member is a lightweight torque transmitting component manufactured by welding together in series alternate relatively heavy forged rings 33 and relatively thin sheet metal rings 35. The blades 18 project radially outwardly from the drum 32 so that said drum forms the radially inner boundary of the compressor air flow passage. A plurality of holes 34 are located in the forged rings of said drum member 32, there being one hole for each of said rotor blades 18 and through which the blade shanks extend. An inner composite rotor shaft 36 is co-axially disposed within the drum member 32. A shoulder 38 on the rear section of said inner shaft 36 is clamped against a shoulder 40 on the drive shaft 26 by a nut 42 threaded on the inner shaft 36. The forward end of the rotor drum member 32 is drivably connected to the forward end of the inner composite shaft 36 as by screws 41. Also the forward end of the drum member 32 and the composite shaft 36 are supported in a bearing support 44 which in turn is supported from the housing 14 by struts 50. A front support 46 is also connected to the struts 50 and a nose piece 48 is connected to said front support.

Referring now to Figs. 3 and 6 in particular, the method of attaching the rotor blades is illustrated in detail. Each rotor blade 18 preferably has a hollow construction, for example as shown in Fig. 5, and is rigidly secured to a spoke 52 forming the blade shank. Each spoke 52 extends through a hole 34 in the drum 32 and has a clevis-like inner end 54. The fit between each spoke 52 and the wall of its hole 34 in the drum is such as to provide a driving connection therebetween and at the same time is sufficiently loose to permit some relative radial sliding therebetween. Also each spoke 52 preferably has a hollow construction, as illustrated in Fig. 6.

The composite inner shaft 36 is made up of a plurality of annular discs 56 alternating with a plurality of annular discs 57 with axially extending cylindrical portions 58, the discs 56 and 57 being clamped together by bolts 60. Each of the discs 56 and 57 has a pair of axially-spaced annular grooves 62 along the periphery of each of said discs. The clevis-like inner end 54 of each spoke 52 extends into the pair of annular grooves 62 in each spoke's associated disc as best seen in Fig. 3. Each blade spoke 52 is pivotally connected to its associated disc by means of a pin 64, passing through a hole 66 in said disc and a hole 68 in the end 54 of the spoke 52, the axis of each pin being parallel to the axis of the drum member 32. The pins 64 are retained in position by a plurality of pin lock sleeves 67, there being one sleeve disposed between two adjacent annular discs 56 and 57 with each sleeve having an annular flange 69 overlying the heads of the adjacent pins 64.

Referring again to Figs. 1 and 2 of the drawing, these figures illustrate the novel construction of the stator housing 14. The housing 14 comprises a forward section 70 and a rear section 72. The forward section 70 is a conventional aluminum casting split along its horizontal centerline to form upper and lower halves. The rear section 72 is fabricated from alternate stretch-formed relatively thin sheet metal rings 74 and relatively heavy turned forged rings 76 welded together to form a one piece stator drum. This stator drum is then split into two semi-cylindrical halves and side flanges 80 are welded along the split edges of the drum to provide flanges for securing the two halves together (as shown in Fig. 2). While each semi-cylindrical half is held in shape in a suitable fixture, stiffener flanges 78 are welded to its now semi-cylindrical forged rings 34 to maintain the roundness of said halves. This construction provides a lightweight stator housing capable of withstanding high temperatures. Each stator blade 20 is fastened to the stator housing by a threaded shank 82 which fits through a counterbored hole 84 in the housing surface and is clamped with a retaining nut 86 as best seen in Fig. 3. Each stage or set of stator blades is attached in this manner to one of the forged rings 76.

When the compressor rotor blades have a relatively lightweight construction, such as the hollow sheet metal construction illustrated, the resulting centrifugal loads are so low that if the blades are attached directly to a rotor disc the disc could be made quite thin without causing excessive stresses in the rotor disc. In fact the discs could be made so thin as to be unmachinable and unhandleable and therefore difficult to manufacture. Therefore, in accordance with the invention, a portion of the thin discs are replaced by the tubular spokes 52 which in turn are fastened to central discs (such as 56 and 57) which are of small diameter. The diameter of the discs is limited only by practical disc thickness and the spacing of the annular grooves 62. The resultant spoke and disc structure has the necessary strength to support the operating loads. The drum member 32 carries the other blade loads resulting from gyroscopic action, vibration excitation, gas pressure and driving torque. The combination of hollow blades, hollow spokes and discs stabilized by the drum member provides an inherently light stiff rotor construction. Such a rotor reduces the bearing loads since such loads are generally proportional to the rotor mass. Consequently the bearings, bearing supports and compressor housing can be made lighter.

In addition the spoke and drum construction has an added advantage in that it provides vibration damping for the rotor blades. In the conventional blade attachment, the centrifugal force present during operation is large enough to solidly anchor the blade in the rotor disc. With the blade thus solidly anchored, there is a minimum opportunity for the blade shank to slide in contact with the rotor disc to frictional damp blade vibrations. However, with the drum and spoke construction, the centrifugal load is carried at the inner discs 56 and 57 so that the pressures acting between the blade butt and the rotor drum member 32 are of limited nature and therefore if the blade should tend to vibrate, slip between the blade butt and rotor drum member will produce frictional damping which will limit the amplitude of vibration. The magnitude of the frictional damping thus obtained will depend on the looseness of the fit between each blade spoke 52 and its associated hole 34 in the drum 32.

Another advantage is found in the manufacture of the component elements of the subject compressor. For example, the discs 56 and 57 and the resultant composite inner shaft 36 are simple machined parts requiring in the main only turning and drilling operations. The blade attachment portion of said discs requires simple turned grooves 62 and reamed holes 66. The spokes 52 are simply lengths of drawn tubing with a clevis-like portion 54 (a relatively simple machined part) rigidly attached. Finally both the drum member 32 and the stator housing 14 are formed by welding together stretch formed sheet metal rings and forged rings. A simple drilling operation provides the holes through which the shanks of the stator and rotor blades extend, there being one hole for each blade. The resultant drum and housing are lightweight, stiff load carrying members.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A rotor for compressors, turbines or like fluid apparatus having blades for reaction with the apparatus fluid; said rotor comprising a drive transmitting member; a rigid annular drum member driveably connected to said drive member and forming the radially inner boundary for said fluid, said drum member having a plurality of circumferentially-spaced holes therethrough; a shaft member co-axially disposed within and driveably connected to said drum member for rotation therewith; a plurality of circumferentially-spaced blades projecting radially outwardly from said drum member, each of said blades having a shank rigidly secured to its inner end and comprising a rod-like spoke extending inwardly through one of said holes into said drum member to provide a driving connection therebetween with each blade spoke slidably engaging the wall of its associated drum member hole and with each blade spoke having a portion rigid with its inner end for pivotal connection with said shaft member, the outer diameter of said shaft member at its connection to said blade spokes being substantially less than the diameter of said drum member at the holes in said drum member through which said spokes pass such that each spoke has a substantial length between the outer diameter of said shaft member and said drum member which is free of contact with said shaft and drum members to provide an open spokelike structure between said members; and means pivotally connecting the inner end portion of each blade spoke to said shaft member with the axis of each said pivotal connection being disposed parallel to the axis of said rotor.

2. A rotor for compressors, turbines or like fluid apparatus having blades for reaction with the apparatus motive fluid; said rotor comprising annular means forming the radially inner boundary for said fluid and having a plurality of axially-spaced sets of holes extending therethrough with the holes of each set being circumferentially-spaced about the axis of said annular means; a plurality of annular discs co-axially disposed and secured together within said annular means, there being one disc for and disposed in alinement with each of said sets of holes; a plurality of axially-spaced sets of blades with the blades of each set being circumferentially-spaced and projecting radially outwardly from said annular means, there being one blade for each of said holes, each of said blades having a shank rigidly secured to its inner end and comprising a rod-like spoke extending inwardly through its associated hole and into said annular means and having a portion rigid with the inner end of said spoke for pivotal connection to the alined annular disc, the outer diameter of each annular disc being substantially less than the diameter of said annular means at the holes in said annular means through which the blade spokes connected to said annular disc pass such that each spoke has a substantial length between the outer diameter of its annular disc and said annular means which is free of contact with said disc and annular means to provide an open spoke-like structure therebetween; and means pivotally connecting the inner end portion of each blade spoke to the periphery of the associated annular disc.

3. A rotor as recited in claim 2 in which each blade spoke has a loose fit with its associated hole so as to slidably engage the wall of said hole.

4. A rotor for compressors, turbines or like fluid apparatus having blades for reaction with the apparatus motive fluid; said rotor comprising a drive transmitting member; a rigid annular drum member drivably connected to said drive member and forming the radially inner boundary for said fluid, said drum member having a plurality of axially-spaced sets of holes extending therethrough with the holes of each set being circumferentially-spaced about the drum member axis; a plurality of annular co-axial discs secured together to form a composite shaft co-axially disposed within and drivably connected to said drum member for rotation therewith, there being one disc for and disposed in alinement with each of said sets of holes; a plurality of axially-spaced sets of blades with the blades of each set being circumferentially-spaced and projecting radially outwardly from said annular means, there being one blade for each of said holes, each of said blades having a shank rigidly secured to its inner end, and comprising a rod-like spoke extending inwardly through its associated hole into said drum member to provide a driving connection therebetween with each blade slidably engaging the wall of its said hole and with each blade spoke having a portion rigid with the inner end of said spoke for pivotal connection to the alined annular disc, the outer diameter of each annular disc being substantially less than the diameter of the drum member at the holes in said drum member through which the blade spokes connected to said annular disc pass such that each spoke has a substantial length between the outer diameter of its annular disc and said drum member which is free of contact with said disc and drum member to provide an open spoke-like structure therebetween; and means pivotally connecting the inner end portion of each blade spoke to the periphery of the associated annular disc with the axis of each said pivotal connection being disposed parallel to the axis of said rotor.

5. A rotor as recited in claim 4 in which said drum member comprises a plurality of side-by-side co-axial rings secured together along their edges with said drum member sets of holes being disposed in alternate rings while the rings between the blade spokes are of relatively thin material.

6. A compressor, turbine or like fluid apparatus having blades for reaction with the apparatus motive fluid; said apparatus including a stator member comprising a plurality of co-axial side-by-side rings secured together along their edges to form a rigid member with alternate rings being of relatively thick material to form a rigid member; a plurality of axially-spaced sets of stator blades with the blades of each set being circumferentially-spaced about the axis of said stator member; means securing said sets of stator blades to the alternate rings of thick material with said blades extending radially inwardly therefrom; a drum-like rotor member co-axially mounted within said stator member to form an annular passage between said stator and rotor members for the apparatus fluid and across which said stator blades extend; said rotor member comprising a plurality of co-axial side-by-side rings secured together along their edges to form a rigid member with alternate rings each having a plurality of circumferentially-spaced holes therethrough and with the other rings being of relatively thin material; a shaft member co-axially disposed within and driveably connected to said rotor member for rotation therewith; a plurality of axially-spaced sets of rotor blades with the blades of each set being circumferentially-spaced and projecting radially outwardly across said annular passage from said rotor member and between the sets of said stator blades, there being one rotor blade for each of said rotor member holes, each of said blades having a shank rigidly secured to its inner end and comprising a rod-like spoke extending inwardly through its associated hole into the drum-like rotor member to provide a driving torque connection therebetween with each blade spoke having a loose fit with its associated hole so as to slidably engage the wall of said hole and with each blade spoke having a portion rigid with the inner end of said spoke for pivotal connection to said shaft member, the outer diameter of said shaft member at each point of connection to a blade spoke being substantially less than the diameter of said drum member at the hole in said drum member through which said blade spoke passes such that each spoke has a substantial length between the outer diameter of said shaft member and said drum member which is free of contact with said shaft and drum member to provide an open spoke-like structure between said members; and means pivotally connecting the inner end portion of each blade spoke to said shaft member with the axis of each said pivotal connection being disposed parallel to the axis of said rotor member.

7. A rotor for compressors, turbines or like fluid apparatus having blades for reaction with the apparatus fluid; said rotor comprising annular means forming the radially inner boundary for said fluid and having a plurality of circumferentially-spaced holes therethrough; a member co-axially disposed within said annular means; a plurality of circumferentially-spaced blades projecting outwardly from said annular means, each of said blades having a shank rigidly secured to its inner end and comprising a rod-like spoke extending inwardly through one of said holes into said annular means and having a portion rigid with the inner end of said spoke for pivotal connection to said member, the outer diameter of said member at its connection to said blade spokes being substantially less than the diameter of said annular means at the holes in said annular means through which said spokes pass such that each spoke has a substantial length between the outer diameter of said member and said annular means which is free of contact with said member and annular means to provide an open spoke-like construction therebetween; and means pivotally connecting the inner end portion of each blade spoke to said member.

8. A rotor as recited in claim 7 in which each blade spoke has a loose fit with its associated hole so as to slidably engage the wall of said hole.

References Cited in the file of this patent

UNITED STATES PATENTS

| | | |
|---|---|---|
| 2,428,330 | Heppner | Sept. 30, 1947 |
| 2,579,745 | Lombard et al. | Dec. 25, 1951 |
| 2,610,786 | Howard | Sept. 16, 1952 |
| 2,637,488 | Krouse et al. | May 5, 1953 |
| 2,662,685 | Blanc | Dec. 15, 1953 |

FOREIGN PATENTS

| | | |
|---|---|---|
| 74,168 | Netherlands | Mar. 15, 1954 |
| 572,859 | Great Britain | Oct. 26, 1945 |
| 623,710 | Great Britain | May 30, 1949 |
| 719,534 | Great Britain | Dec. 1, 1954 |